(12) United States Patent
Sabbouh

(10) Patent No.: US 7,877,726 B2
(45) Date of Patent: Jan. 25, 2011

(54) SEMANTIC SYSTEM FOR INTEGRATING SOFTWARE COMPONENTS

(75) Inventor: Marwan Sabbouh, Chelmsford, MA (US)

(73) Assignee: The MITRE Corporation, McLean, VA (US)

( * ) Notice: Subject to any disclaimer, the term of this patent is extended or adjusted under 35 U.S.C. 154(b) by 820 days.

(21) Appl. No.: 10/890,020

(22) Filed: Jul. 13, 2004

(65) Prior Publication Data

US 2006/0015843 A1 Jan. 19, 2006

(51) Int. Cl.
*G06F 9/44* (2006.01)
*G06F 7/00* (2006.01)
*G06F 17/00* (2006.01)
*G06F 15/18* (2006.01)

(52) U.S. Cl. .................. 717/106; 707/708; 706/11; 706/12

(58) Field of Classification Search ............... 717/106
See application file for complete search history.

(56) References Cited

U.S. PATENT DOCUMENTS

| | | | | |
|---|---|---|---|---|
| 6,560,633 | B1* | 5/2003 | Roberts et al. | 709/202 |
| 6,847,974 | B2* | 1/2005 | Wachtel | 707/101 |
| 7,146,399 | B2 | 12/2006 | Fox et al. | |
| 7,424,701 | B2* | 9/2008 | Kendall et al. | 717/105 |
| 2003/0101170 | A1* | 5/2003 | Edelstein et al. | 707/3 |
| 2003/0120665 | A1* | 6/2003 | Fox et al. | 707/100 |
| 2003/0163450 | A1* | 8/2003 | Borenstein et al. | 707/1 |
| 2003/0163597 | A1* | 8/2003 | Hellman et al. | 709/316 |
| 2003/0167445 | A1* | 9/2003 | Su et al. | 715/513 |
| 2003/0172368 | A1* | 9/2003 | Alumbaugh et al. | 717/106 |
| 2004/0054690 | A1* | 3/2004 | Hillerbrand et al. | 707/104.1 |
| 2004/0083199 | A1* | 4/2004 | Govindugari et al. | 707/1 |
| 2004/0093344 | A1* | 5/2004 | Berger et al. | 707/102 |
| 2004/0126840 | A1 | 7/2004 | Cheng et al. | |
| 2004/0216030 | A1* | 10/2004 | Hellman et al. | 715/500 |
| 2004/0230636 | A1* | 11/2004 | Masuoka et al. | 708/800 |
| 2004/0243595 | A1* | 12/2004 | Cui et al. | 707/100 |
| 2005/0091386 | A1* | 4/2005 | Kuno et al. | 709/228 |
| 2005/0138634 | A1* | 6/2005 | Luty et al. | 719/315 |
| 2006/0015843 | A1* | 1/2006 | Sabbouh | 717/106 |
| 2006/0173868 | A1* | 8/2006 | Angele et al. | 707/100 |
| 2006/0206883 | A1 | 9/2006 | Sabbouh | |
| 2008/0168420 | A1* | 7/2008 | Sabbouh | 717/104 |

OTHER PUBLICATIONS

Obrst et al., "Ontologies for Coporate Web Applications", Nov. 3, 2003, retrieved from <www.aaai.org/ojs/index.php/aimagazine/article/download/.../1616>, pp. 49-62.*

(Continued)

*Primary Examiner*—Tuan Q Dam
*Assistant Examiner*—Marina Lee
(74) *Attorney, Agent, or Firm*—Sterne, Kessler, Goldstein & Fox PLLC

(57) ABSTRACT

A system and method for integrating databases and/or web services into a searchable ontological structure. The structure allows for free-form searching of the combined system and for the discovery of an execution path through the ontology. The discovered execution path (or paths) provides for the generation of code that integrate databases and services for the purpose of fusing information from disparate databases and Web services.

21 Claims, 11 Drawing Sheets

OTHER PUBLICATIONS

Sabbouh et al., "Using Semantic web technologies to integrate software components", Proceedings fo teh ISWC 2004 Workshop on Semantic Web Services, retrieved from <http://ftp.informatik.rwth-aachen.de/Publications/CEUR-WS/Vol-119/paper8.pdf> total pp. 15.*

Duane Merrill, "Mashups: The new breed of Web app An introduction to mashups" , , Published Aug. 8, 2006, retrieved from<http://www.ibm.com/developerworks/xml/library/x-mashups.html> total pp. 10.*

Obrst et al. "Frameworks for semantics in web services workshop", Jun. 10, 2005, retrieved from <http://www.w3.org/2005/04/FSWS/Submissions/35/MITREpositionpaperV1.4.pdf> total pp. 8.*

Berners-Lee, et al., "The Semantic Web," Scientific American, May 2001 (available at http://www.sciam.com/print_version.cfm?articleID=00048144-10D2-1C70-84A9809EC588EF21).

Crubezy, M., et al., "Mediating knowledge between application components", Semantic Integration Workshop of the Second International Semantic Web Conference (ISWC-03), Sanibel Island, Florida, CEUR, 82. 2003 (available at http://smi-web.stanford.edu/pubs/SMI_Reports/SMI-2003-0978.pdf).

Daconta, et al., The Semantic Web: A Guide to the Future of XML, Web Services, and Knowledge Management, Wiley US, Jul. 2003.

Herrera, X., "The bottom line for accurate massed fires: common grid," Field Artillery Journal, Jan.-Feb. 2003, 5-9 (2003).

Hobbs, J., "A DAML ontology of time", 2002 (available at http://www.cs.rochester.edu/~ferguson/daml/daml-time-nov2002.txt).

Gruber, T.L., "A translation approach to portable ontologies", Knowl. Acquis., 5, 199-220 (1993).

Guarino, et al., "Ontologies and Knowledge Bases: Toward a Terminological Clarification," in Towards Very Large Knowledge Bases: Knowledge Building and Knowledge Sharing, N. Mars, (ed.), IOS Press, Amsterdam, 1995 (available at http://www.loa-cnr.it/Papers/KBKS95.pdf).

Sabbouh, M., "Semantic Integration of C2 Enterprise," MITRE Corp., Mar. 17, 2005. (available at http://www.mitre.org/news/events/tech04/briefings/1526.pdf).

Sabbouh, M and DeRosa, J.K., "Using Semantic Web Technologies To Integrate the Enterprise," Proceedings of the Third International Semantic Web Conference (ISWC 2004), Nov. 2004 (available at http://www.mitre.org/work/tech_papers/tech_papers_04/derosa_semantic/derosa_semantic.pdf.

Sabbouh, M., et al., "Using Semantic Web Technologies to Enable Interoperability of Disparate Information Systems," MITRE Corp., Sep. 2005 (available at http://www.mitre.org/work/tech_papers/tech_papers_05/05_1025/05_1025.pdf).

Sabbouh, M. and Pulvermacher, M.K., "Wedding the Web: An Example of a Services and Semantics Marriage that Works", MITRE Corp., Jun. 2004 (available at http://www.mitre.org/work/tech_papers/tech_papers_04/sabbouh_web/sabbouh_web.pdf).

Semy, S.K., et al., "Towards the Use of an Ontology for U.S. Government and U.S. Military Domains," MITRE Technical Report 04B0000063, MITRE Corp., Sep. 2004 (available at http://www.mitre.org/work/tech_papers/tech_papers_04/04_0603/04_1175.pdf).

Smith, B., "Ontology," in Blackwell Guide to the Philosophy of Computing and Information, L. Floridi (ed.), Oxford: Blackwell, 2003, 155-156 (available at http://ontology.buffalo.edu/smith/articles/ontology_pic.pdf).

National Imagery and Mapping Agency (NIMA) USA, GEOTRANS 2.2.4-Geographic Translator (available at http://earth-info.nima.mil/GandG/geotrans/).

OWL-S: Semantic Markup for Web Services (available at http://www.w3.org/Submission/OWL-S/, Nov. 2004).

OWL-Services (OWL-S) effort (available at http://www.daml.org/services/owl-s/1.0).

RDF schema (available at http://www.w3.org/TR/rdf-schema/).

Universal Description, Discovery and Integration (UDDI) (available at http://www.uddi.org/specification.html).

Web Services Description Language (WSDL) available at http://www.w3.org/2002/ws/desc).

Web Service Modeling Ontology (WSMO) (available at http://www.w3.org/Submission/WSMO/, Jun. 2005).

World Wide Web Consortium (W3C) proposed recommendation for a standard web ontology language (OWL) (available at http://www.w3.org/TR/2004/REC-owl-features-20040210).

Sabbouh, M., "Semantic Integration of the C2 Enterprise," Boston Knowledge Management Forum, Mar. 17, 2005. (Available at http://www.kmforum.org/content/Sabbouh_2005-v2-msm-tokmf.ppt).

Sabbouh, M., "Semantic Integration of C2 Enterprise," MITRE Corp., Apr. 28, 2004. (Available at http://www.mitre.org/news/events/tech04/briefings/1526.pdf).

Final Office Action dated Jan. 22, 2010, U.S. Appl. No. 11/377,459, filed Mar. 17, 2006, Sabbouh, 15 pages.

Non-Final Office Action dated May 11, 2009, U.S. Appl. No. 11/377,459, filed Mar. 17, 2006, Sabbouh, 18 pages.

Xu, Li and David W. Embley., Discovering Direct and Indirect Matches for Schema Elements, In 8th International Conference on Database Systems for advanced Applications, Mar. 26-28, 2003, 25 pages.

* cited by examiner

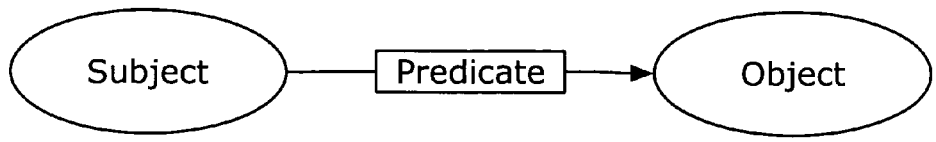
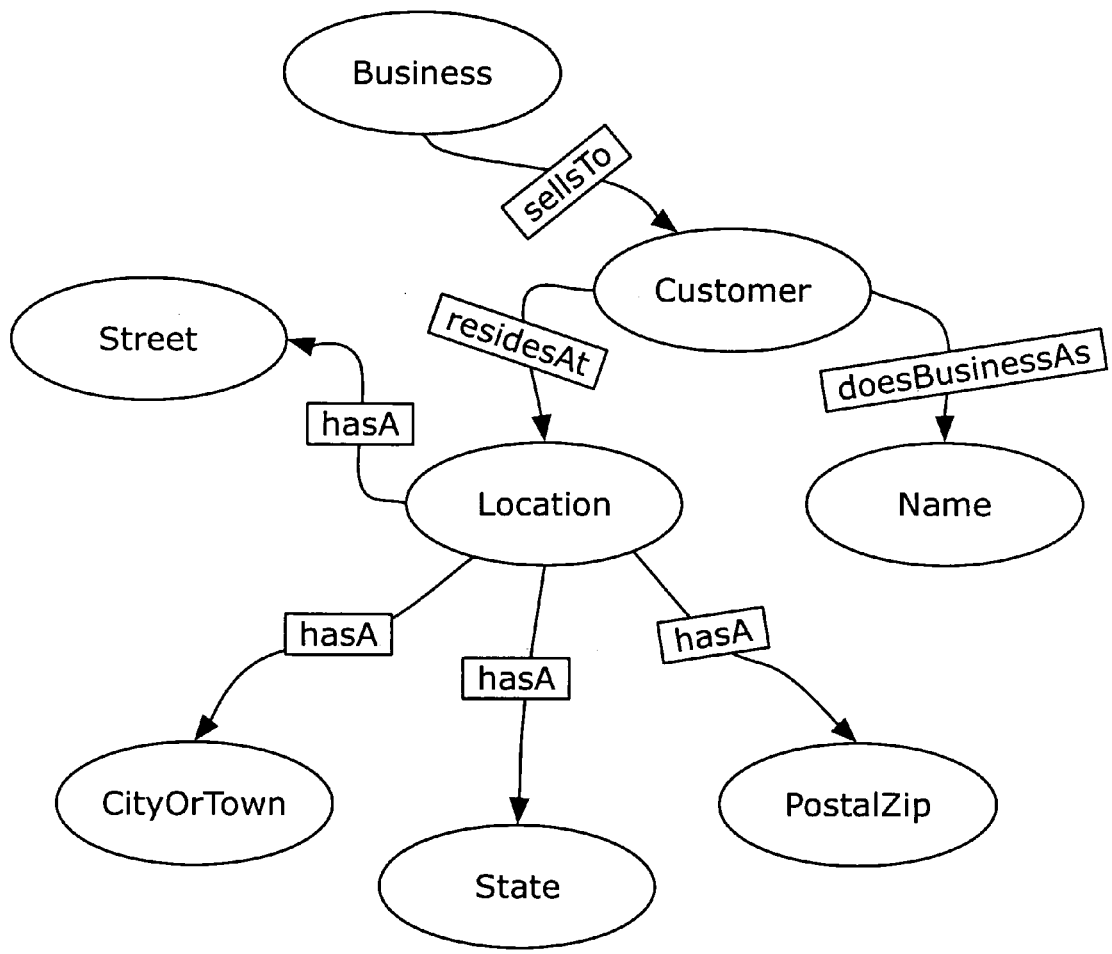
FIG. 2

SEMANTIC SYSTEM FOR INTEGRATING SOFTWARE COMPONENTS

This invention was made with government support under Grant Number FA-8721-04-C0001, awarded by The United States Air Force, Electronic Systems Center. The government has certain rights in the invention.

FIELD OF THE INVENTION

The present application relates to a system for integrating software components using a semantic ontology management system.

BACKGROUND OF THE INVENTION

Web service standards are enjoying widespread adoption in corporations across many industries. Corporations are recognizing the value of making it easier for other applications to consume their data by using web standards such as the Hyper Text Transfer Protocol (HTTP), web addressing, and Extensible Markup Language (XML). Using these standards, software clients written in one programming language can access and retrieve information from a server, irrespective of the technology (e.g., hardware, operating system, and programming language) that the server uses.

However, even with the adoption of these web standards, problems remain. For example, although XML is mature as a syntax for web data exchange, current XML technologies do not supply the capabilities provided by more mature technologies like relational database systems. Also, while solutions that aid in web service discovery (e.g., Universal Description, Discovery and Integration (UDDI), as described at uddi.org/specification.html, incorporated by reference herein) and invocation (e.g., Web Services Description Language (WSDL), incorporated by reference herein) are emerging, they are far from mature. Similarly, technologies that reason with web service description files for the purpose of chaining web services are not available. It is left to the programmer to determine, at design time, which web services to invoke, the order in which they need to be invoked, and the formatting of information necessary to complete an operation. As a result, the programmer writes much of the "glue code" necessary for a particular computation. A need still exists for methods and systems that allow automatic generation of such "glue code," as well as automatic discovery and integration of available web services and data repositories.

SUMMARY OF THE INVENTION

In one aspect, the invention is a method of generating executable code for linking data in a structured data repository to structured inputs and outputs from a source web service. According to the method, a first domain ontology encoding the structured data repository and a second domain ontology encoding the structured inputs and outputs of the source web service (and optionally also access parameters for the web service) are provided, and are linked to form a merged ontology. Data from the structured data repository and the web service are mapped into the merged ontology to create an expanded ontology. One or more desired input(s) and output(s) are specified for a linked web service, and the expanded ontology is searched for an execution path between the desired input(s) and output(s), which may include at least one concept from the first ontology and one concept from the second ontology. Executable code is then generated that executes steps of the execution path in order to produce the desired outputs. The expanded ontology may be created either by mapping data from the structured data repository and structured inputs and outputs from the web service into the merged ontology, or into the first domain ontology and second domain ontology before merging.

In another aspect, the invention is a method of constructing a new web service that provides a selected output type in response to a selected input. The method includes accepting an input item and an output type from a user, and searching an ontology to find one or more input matches for the input item and output matches for the output type. The ontology comprises structured data from one or more structured data repositories and structured input and output information from one or more existing web services. Once match(es) for the input item and output type are found, the ontology is searched to find execution path(s) that link input match(es) and output match(es). (If multiple execution paths are found, a user may be permitted to select a desired path, and if multiple input and/or output matches are found, a user may also be permitted to select among the matches found). The execution path is then used to generate executable code for the new web service, which allows a user to provide input of a type corresponding to the accepted input item, and provides an output of the accepted output type. The execution path may include at least one concept from a structured data repository and at least one concept from structured input and output information from an existing web service.

In yet another aspect, the invention is a method of selecting and accessing one or more web services, wherein each web service has a set of one or more structured input(s) and output (s). The method includes providing a domain ontology that includes mappings to the structured input(s) and output(s) (and optionally access parameters for a web service in the ontology), specifying one or more desired inputs and outputs, and searching the domain ontology to match the one or more desired inputs and outputs. The domain ontology is also searched for an execution path linking the one or more structured inputs to the one or more structured outputs. The web service(s) having mappings on the execution path are then returned to a user. When a plurality of web services is returned, the web services may form a chain in which a structured output of one web service provides a structured input for another web service.

In still another aspect, the invention comprises a method of mapping a web service having a set of one or more structured input(s) and one or more structured output(s) to a domain ontology. Them method includes identifying an input type for each of the structured input(s), searching the ontology for concepts having each input structure type and adding mappings between the structured inputs and the located concepts in the ontology, and searching the ontology for concepts having each output structure type and adding mappings between the structured outputs and the located concepts in the ontology. A concept is then added to the ontology representing the web service and adding mappings between the added concept, the structured inputs, and the structured outputs. In addition, access parameters for the web service may be added. The ontology may also include concepts and relationships derived from one or more structured data repositories.

In a further aspect, the invention is a software tool for accessing a structured data repository and a source web service having structured inputs and outputs. The tool includes a searchable ontology structure, an interface for a user to specify one or more input items and one or more output types, a search module that searches the searchable ontology for an execution path linking the specified input item(s) and output type(s), and a query module that traverses the execution path to provide output of the output type(s) that is linked to the input item(s) in the ontology. The searchable ontology structure includes concepts and relationships from a selected knowledge domain, concepts and relationships of the structured data repository, and concepts and relationships of the structured input(s) and output(s) of the web service. The concepts and relationships of the structured data repository and of the web service are linked to the concepts and relationships from the selected knowledge domain, and the execution path may include concepts from both the structured data repository and the web service. The tool may also include a code generation module that generated executable code that carries out the execution path, and/or a selection module that allows a user to select among a plurality of execution paths.

BRIEF DESCRIPTION OF THE DRAWING

The invention is described with reference to the several figures of the drawing, in which, FIG. 1 is a generic "triple" showing the relationship conveyed in graphs shown in this document;

FIG. 2 is a domain ontology for an address domain;

DETAILED DESCRIPTION OF CERTAIN PREFERRED EMBODIMENTS

Definitions

Figure 3:
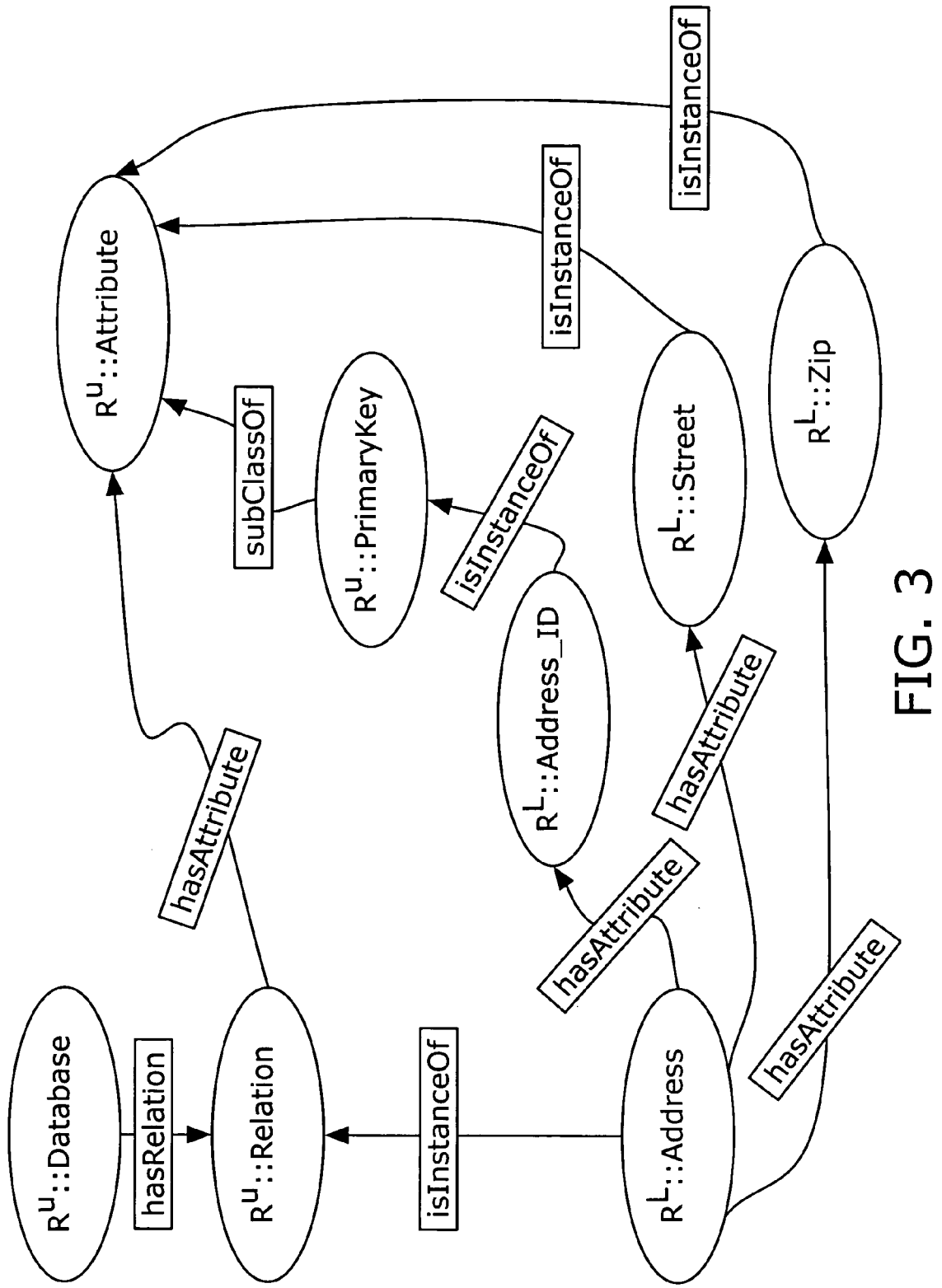
FIG. 3 is a partial ontology for an address database.

As used herein, a "web service" is an application program (for example, a program implemented in Java or PHP on the World Wide Web) that accepts defined input(s) and returns defined output(s), and that exposes its interface, for example using Web Services Definition Language (WSDL). Example web services include the map servers found at MapQuest™ and Yahoo! Maps™, online telephone directories such as Switchboard.com™, and online weather services such as Weather.com™ and the National Weather Service site. While the web services discussed in the specification are available on the World Wide Web, the term "web service" is also intended to include services accessible only on internal intranets (such as an employee "facebook" or directory) or on standalone computers (such as an XML front end to a database or application program).

As used herein, a "database" or "structured data repository" is a collection of data having a formalism (i.e., structured data). Databases may be organized into "tables" of "records" having "fields" as is conventional in the art (see, e.g., *Webster's New World Dictionary of Computer Terms*, 4th ed., Prentice Hall, New York, 1992), or may be more loosely structured (e.g., a structured text file or a tagged file format document).

As used herein, a "triple" or "RDF triple" is a statement that conveys information about a resource, and that can be represented as a subject, a predicate, and an object. As depicted herein, a triple is graphically represented as shown in FIG. 1, wherein subject and object nodes are connected by a directional line representing the predicate. An example statement that could be represented as a triple might be "the book *Moby Dick* (subject) has an author (predicate) whose value is Herman Melville (object)." Subject, predicate, and object can all be identified by uniform resource identifiers (URIs), such as a uniform resource locator (URL). Predicates are generally properties of resources, while subjects and objects may be described as "concepts."

As used herein, an "ontology graph" or simply a "graph" is a collection of related triples that together convey information about the relationships between the concepts represented by the nodes of the graph (the set of objects and subjects of the statements represented by the triples).

As used herein, an "ontology" or "domain ontology" is a dictionary of terms within a given domain of knowledge, formulated in a known syntax and with commonly accepted definitions, including relationships between the terms (e.g., in the form of triples or an ontology graph).

Semantic Web Technologies

Today, Semantic Web technologies are beginning to emerge with promises of enabling a much faster integration of applications and data (see, e.g., Gruber, "A Translation Approach to Portable Ontologies," *J. Knowledge Acquisition*, 5(2):199-200, 1993; Guarino, et al., "Ontologies and Knowledge Bases: Towards a Terminological Clarification," in *Towards Very Large Knowledge Bases: Knowledge Building and Knowledge Sharing*, N. Mars, ed., IOS Press, Amsterdam, 1995; Berners-Lee, et al., "The Semantic Web," *Scientific American*, May 2001; and Daconta, et al., *The Semantic Web: A Guide to the Future of XML, Web Services, and Knowledge Management*, Wiley US, July 2003, all of which are incorporated by reference herein). However, for that to happen, Semantic Web technologies must facilitate access to large amounts of data with minimal programmer intervention. Web services must be discovered, chained, and invoked automatically, thus relieving the programmer from having to do these steps. Semantic Web standards provide a rich framework for the precise description of data and applications, thereby enabling greater automation in this end-to-end web service execution process. The World Wide Web Consortium (W3C) proposed recommendation for a standard web ontology language (OWL), (incorporated by reference herein), builds on web technologies including XML's ability to define customized tagging schemes and RDF's flexible approach to representing data.

Convergence between web services and Semantic Web technologies is beginning as illustrated by the OWL-Services (OWL-S) effort which is incorporated herein by reference). OWL-S is an effort to develop a web service ontology that could be used to describe the properties and capabilities of web services in unambiguous, computer-interpretable form.

According to the invention, such Semantic Web technologies can be used to discover execution paths spanning the retrieval of data from structured data repositories and execution of web services, to automate the integration of data repositories and web services, and to automatically generate the "glue code" needed to achieve the integration. The example described below shows how a marriage of web services and Semantic Web technologies can further automate this integration process. OWL-S represents a partial solution that can be used according to the invention to orchestrate web services. The example also illustrates how databases can be mapped into ontologies according to the invention, thus making their data available to web services.

An information system will need the capability to integrate new and existing services, e.g., application programs or web services, and incorporate additional information resources, e.g., relational databases or XML documents. In most cases application programs and web services require access to information contained within a data source. Very often the challenge for IS systems is to integrate existing data sources with application programs or web services. The use of IS ontologies and an ontology management system according to the invention can enable this type of integration by generating the integration code automatically.

The existing OWL-S web service ontology model provides features for invoking and accessing web services. However OWL-S does not address the need for web service integration and interaction with an existing database without first building a web service that abstracts the database. The invention provides a methodology to enable the integration of new web services with existing databases.

By representing databases and web services in ontology space and by linking them to the domain ontology, we can now integrate with existing databases, and other web services, without developing additional code. Using IS ontologies in this way not only results in code being generated, but also eliminates the need for creating a web service ontology with composite processes comprised of control flow constructs as defined in OWL-S.

EXAMPLES

The invention is described below with reference to particular examples such as integrating a database with a web service, and "chaining" multiple web services. However, those of ordinary skill in the art will readily see that the inventive techniques may be used in a variety of ways, including rapidly integrating pluralities of legacy databases and/or web services into new systems without a need for extensive programming, and selecting appropriate web services from within an ontology without a need for user familiarity with the available web services. Further, the invention may be used not only with an "ontology viewer" to process individual user queries, but may also be used to construct custom Information System (IS):web/database services that access underlying databases and web services as needed to process queries.

The following example shows how an address database and a map-finding web service (e.g., the map services available at MapQuest™ and Yahoo!™) may be integrated according to the invention, by performing the following steps:
  Provide a domain ontology
  Create and link a database component ontology to the domain ontology
  Create and link a web service component ontology to the domain ontology
  Broker a user request to suggest executable paths
  Manually view the result of implementing one of the executable paths through the augmented ontology or automatically generate a web service to do so The domain ontology, D, includes the RDF classes Business, Customer, Name, Location, Street, CityOrTown, State, and PostalZIP. D is represented as a uniform structure of triples, {subject, relationship, object}, as shown in Table 1. This ontology may also be represented graphically, as shown in FIG. 2. (Note that the domain ontology may include other classes and relationships; for simplicity, only seven triples from the ontology are shown).

TABLE 1

D::{Business, sellsTo, Customer}
D::{Customer, doesBusinessAs, Name}
D::{Customer, residesAt, Location}
D::{Location, hasA, Street}
D::{Location, hasA, CityOrTown}
D::{Location, hasA, State}
D::{Location, hasA, PostalZIP} sellsTo, doesBusinessAs, and residesAt are OWL object properties, and hasA is an OWL datatype property with domain rdf:Class and range datatype string. As shown, this domain ontology is manually created, typically by experts in the business domain to which it pertains. It may be possible to automatically create useful domain ontologies using artificial intelligence techniques or other methods; such ontologies may also be used according to the invention.

A database ontology R is then constructed for linking to the domain ontology D to form an augmented ontology $D^+$. R is the conjunction of a database upper ontology $R^U$ specifying the structure, algebra, and constraints of the database, and a database lower ontology $R^L$ including the data as instances of $R^U$, as follows.

The upper ontology $R^U$ specifies the structure, algebra and constraints of any relational databases in RDF/OWL triples. We define the RDF classes Database, Relation, Attribute, PrimaryKey and ForeignKey. A portion of $R^U$ is given in Table 2:

TABLE 2

$R^U$::{Database, hasRelation, Relation}
$R^U$::{Relation, hasAttribute, Attribute}
$R^U$::{PrimaryKey, subClassOf, Attribute}
$R^U$::{ForeignKey, subClassOf, Attribute} where hasRelation and hasAttribute are OWL object properties, and subClassOf is defined in the RDF schema.

Consider a database having a table ADDRESS as depicted in Table 3. (For brevity, only two of the data records are shown). The relation ADDRESS has Address_ID as the primary key, and Name, Street, City, State, and Zip as attributes. The portion of $R^L$ corresponding to this table may then be constructed (in part) as shown in Table 4.

TABLE 3

| Address_ID | Name | Street | City | State | Zip |
|---|---|---|---|---|---|
| . | . | . | . | . | . |
| . | . | . | . | . | . |
| 001 | The MITRE Corporation | 202 Burlington Road | Bedford | MA | 01730 |
| 002 | XYZ, Inc. | 255 North Road | Chelmsford | MA | 01824 |
| . | . | . | . | . | . |
| . | . | . | . | . | . |

TABLE 4

$R^L$::{Address, isInstanceOf, Relation}
$R^L$::{Address, hasAttribute, AddressI_D}
$R^L$::{Address, hasAttribute, Street}
$R^L$::{Address, hasAttribute, Name}
$R^L$::{Address, hasAttribute, Zip}

TABLE 4-continued $R^L$::{Name, isInstanceOf, Attribute}
$R^L$::{Street, isInstanceOf, Attribute}
$R^L$::{Zip, isInstanceOf, Attribute}
$R^L$::{Address_ID, isInstanceOf, PrimaryKey}

R is then the conjunction of $R^U$ and $R^L$ as partially shown in FIG. 3 (Note that the fields "City" and "State" have not been shown in R for the sake of brevity, but are linked to the concepts "CityOrTown" and "State" in D in a manner analogous to that shown for "Street" and "Zip" below). If there are entity relationships not captured in the R, these may be inserted manually at this stage.

The concepts in database ontology R are then mapped to the concepts in the domain ontology D to create an augmented domain ontology $D^+$. In this example, this is done using the relationship hasSource, as shown in Table 5. (Note that the linked concepts need not have identical names, as in the mapping between D::PostalZIP and R::Zip).

TABLE 5

$D^+$::{D::Name, hasSource, R::Name}
$D^+$::{D::Street, hasSource, R::Street}
$D^+$::{D::PostalZIP, hasSource, R::Zip}

Figure 4:
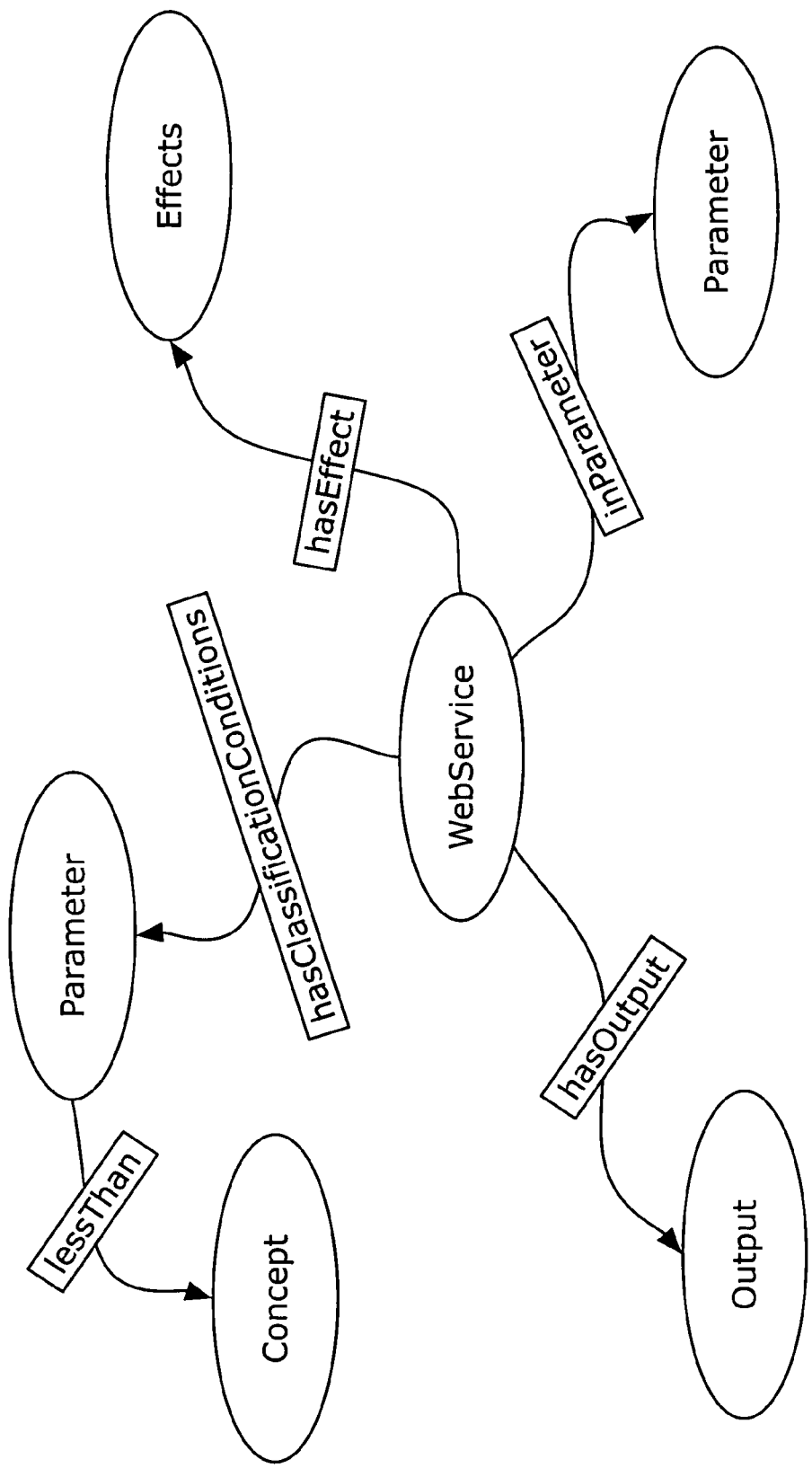
FIG. 4 is a generic upper ontology for a web service.
Figure 5:
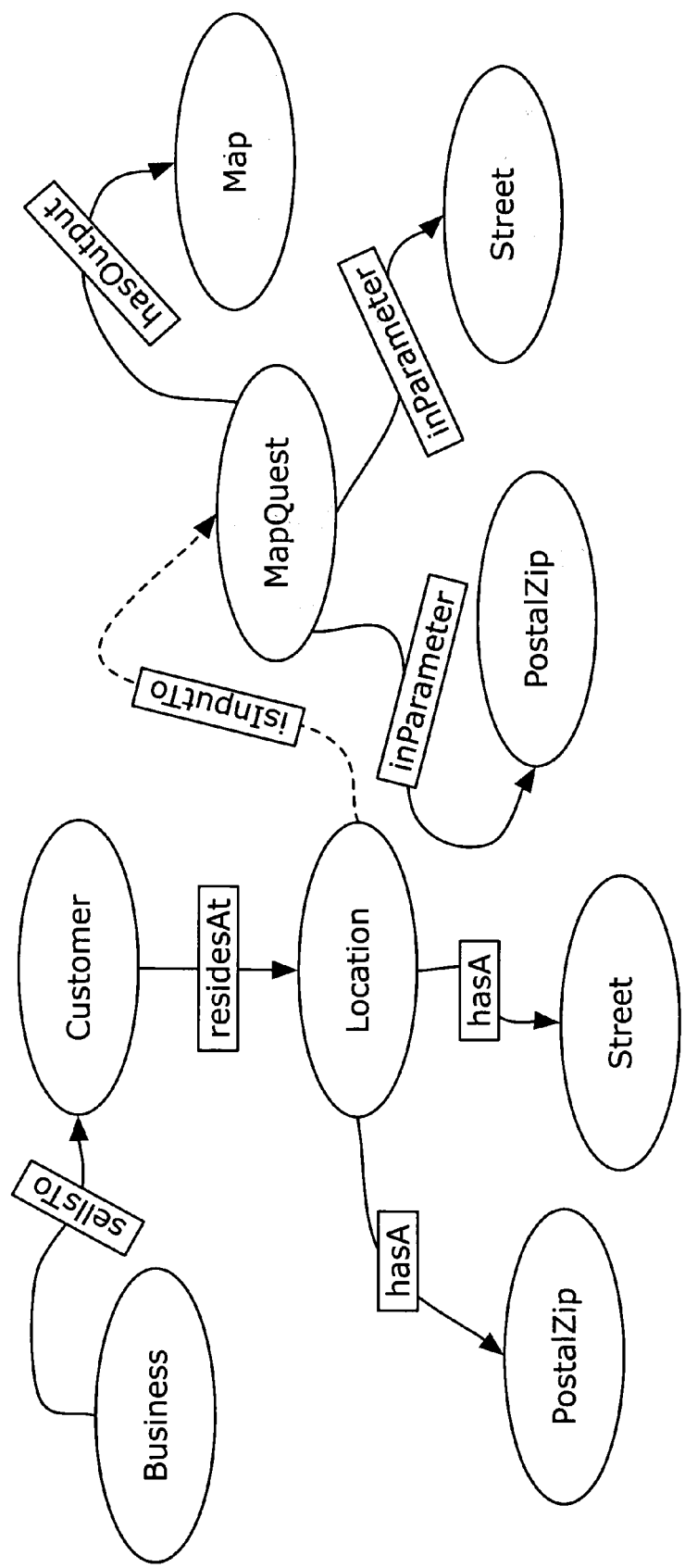
FIG. 5 is a portion of an augmented domain ontology $D^+$.

The map-finding web service is then mapped to an upper ontology $W^U$ that models web services as concepts of Inputs (in Parameters), Output, Classification Conditions, and Effects, as shown in FIG. 4. An instance of this ontology, $W^I$, is created for the map-generation web service of the example. This ontology is then mapped to $D^+$ to form augmented ontology $D^{++}$, for example using the relationship isInputTo, e.g. $D^{++}$:: {$D^+$::Location, is InputTo, $W^I$::MapQuest}. A portion of $D^{++}$, showing a link between $W^I$ and $D^+$, is shown in FIG. 5.

Figure 6:
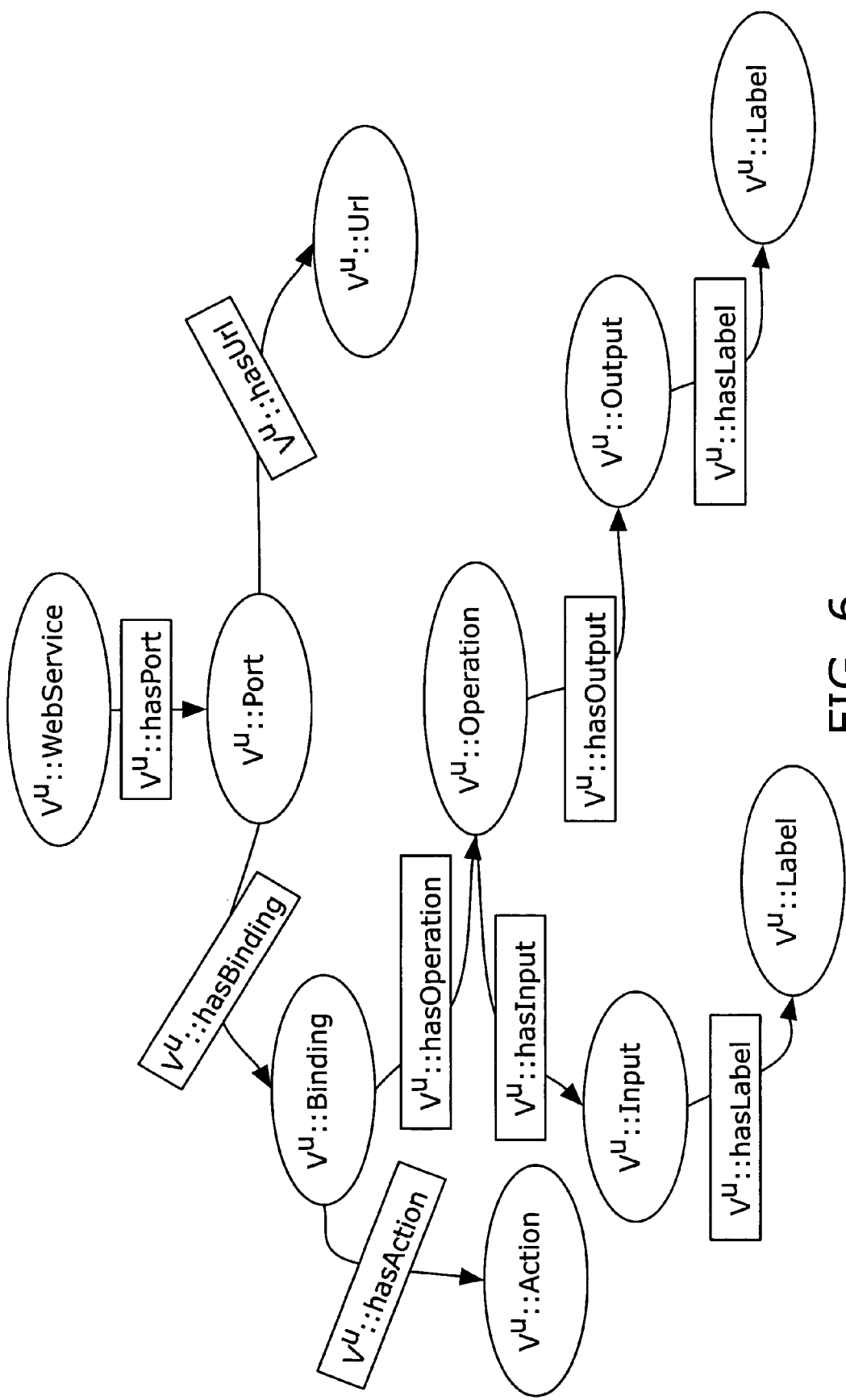
FIG. 6 is a generic upper ontology for accessing a web service.
Figure 7:
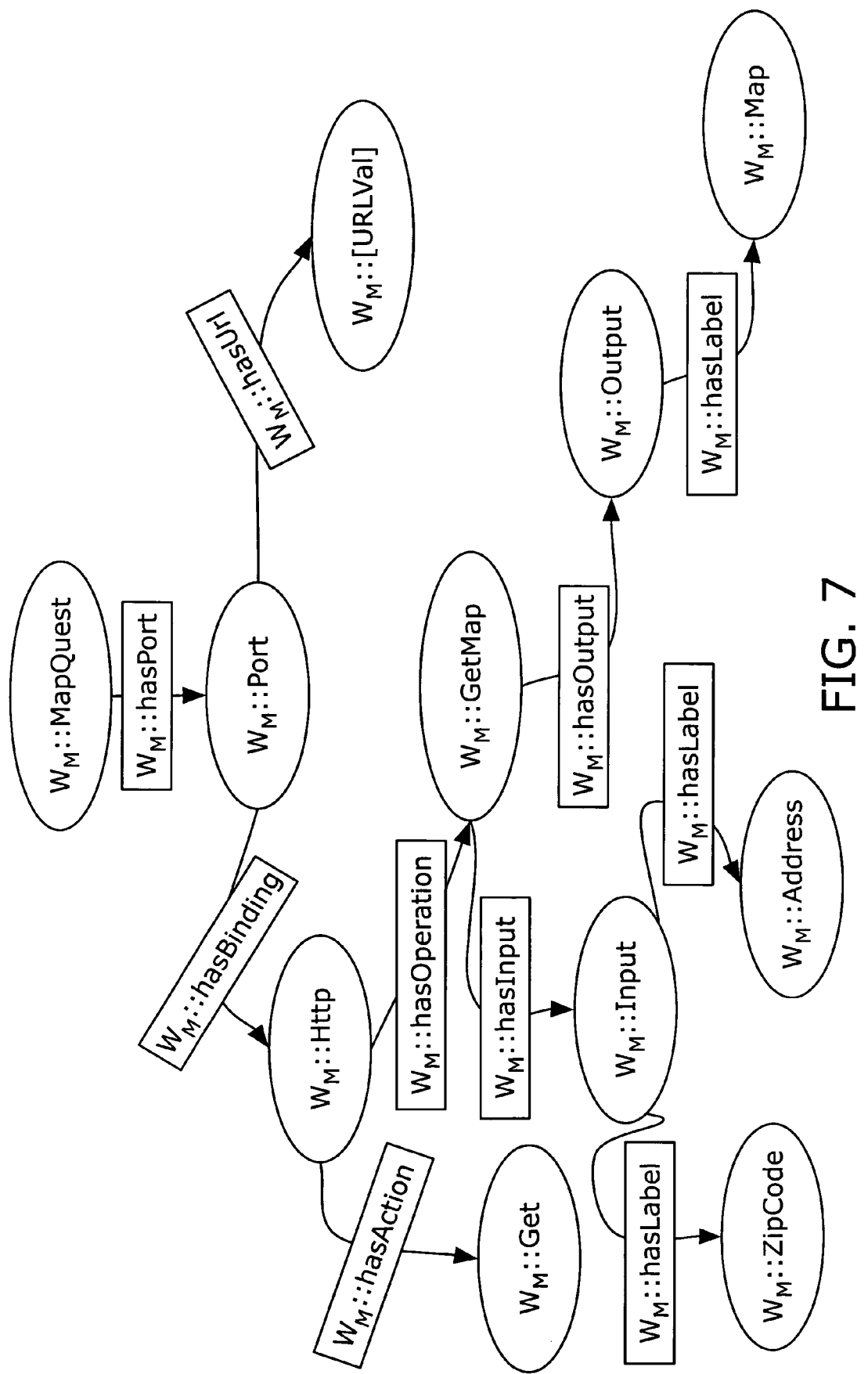
FIG. 7 is an instance of the ontology of FIG. 6 for a specific web service.
Figure 8:
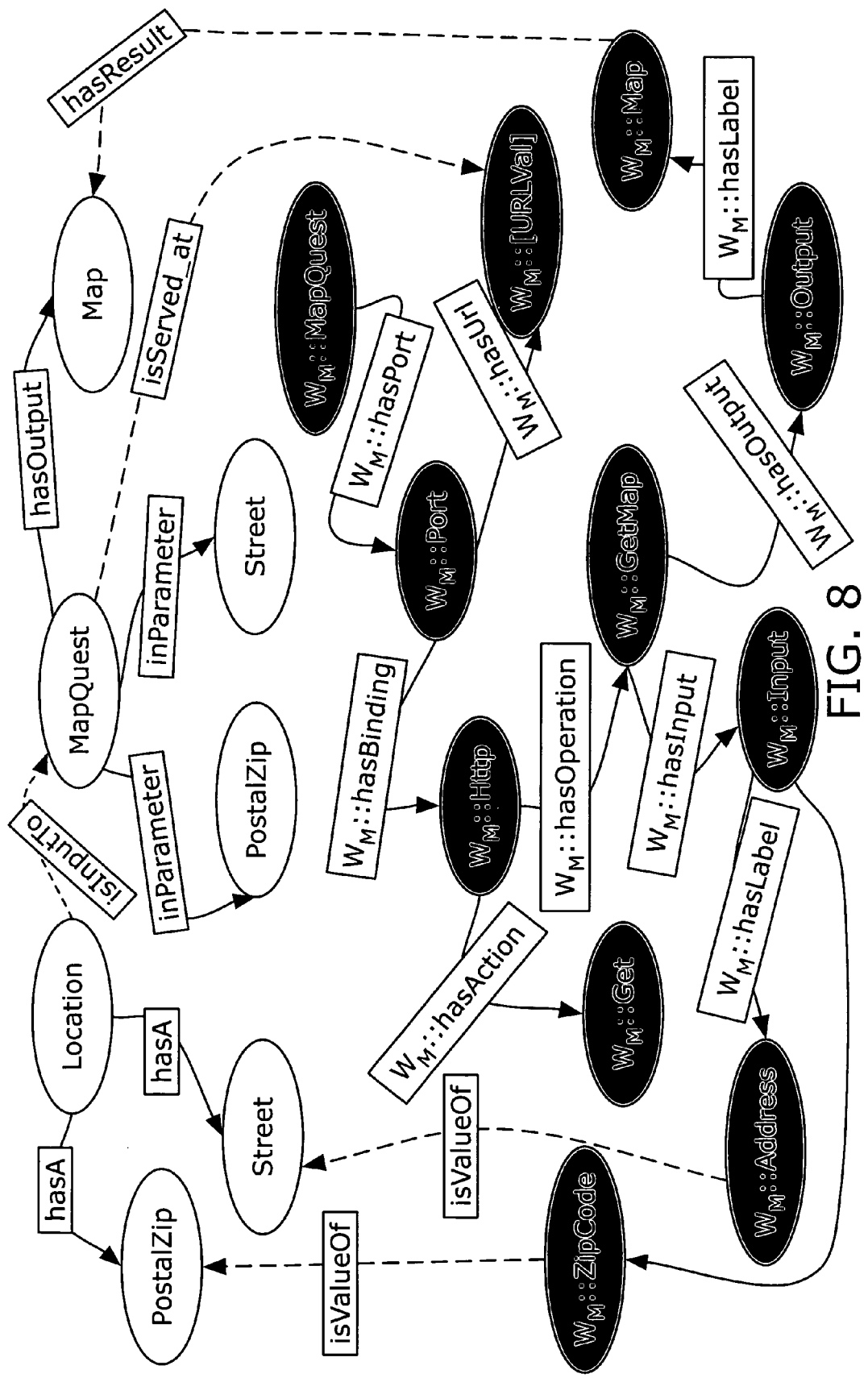
FIG. 8 is a portion of an augmented domain ontology $D^{++}$.

For automatic code generation, in addition to the ontological representation of the inputs and outputs of the web service, access parameters for the web service may be needed. A generic upper ontology, $V^U$, that models how to access and invoke a web service is shown in FIG. 6. $V^U$ also preserves the structure of any document consumed or produced by the web service. An instance of this ontology, $W_M$, is created to describe the parameters for invoking the web service. As shown in FIG. 7, $W_M$ shows parameters for invoking MapQuest™. (For clarity in the drawing, the URL for MapQuest™, is represented as [URL Val]). $W_M$ is then mapped into $D^{++}$, for example using the relationships isValueOf, isServedAt, and hasResult. The isValueOf links the range or object value of the hasLabel relationship in the ontology $W_M$ to concepts in the augmented domain ontology $D^{++}$. The isServedAt relationship links the subject or domain of the hasOutput relationships in the $D^{++}$ ontology to the object of the hasUrl relationship in the WM. The hasResult relationship links the range of hasLabel relationship in the $W_M$ to the range of hasOutput relationship in the ontology $D^{++}$. This relationship is useful when the output of the web service contains the inputs of another, as further discussed below. A portion of $D^{++}$ including $W_M$ and $W^I$ is shown in FIG. 8, illustrating the links between the web service ontologies and the domain ontology.

Once the ontology $D^{++}$ has been created, a single application (hereinafter, the "Semantic Viewer") can broker a variety of user requests to return data outputs and/or executable glue code. As implemented in this example, the Semantic Viewer is a web-enabled application. When a user enters any input data, it is linked to concepts in the augmented domain ontology using the userInput, userOutput, and userCriteria relationships. The userOutput links a goal the user is interested in a concept in the augmented domain ontology. The userInput links the user's input to the object value of the in Parameter relationship that are not input to web services in the augmented domain ontology. The userCriteria is used to link user's input to concepts in the augmented domain ontology.

Figure 9:
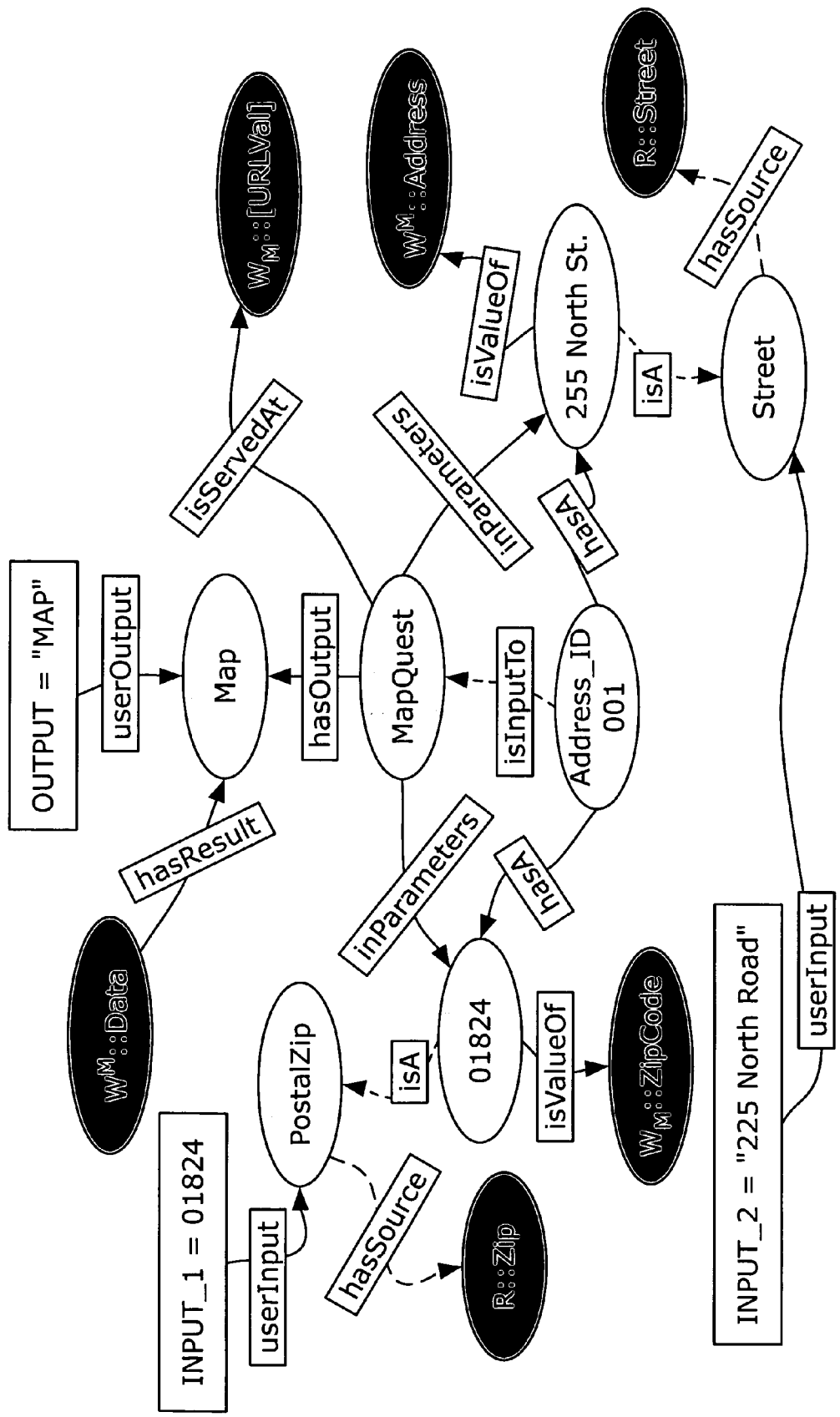
FIGS. 9, 10, 11A, and 11B show execution paths within $D^{++}$.

For example, suppose a user provides "255 North Road" and "01824" as inputs, and "map" as a requested output. The Semantic Viewer searches $D^{++}$ for matches to the input values, and locates them in $R^L$ as a Street and a Zipcode, respectively. In addition, it searches for "map" and locates it as a concept in $W^I$. It then locates a path through the ontology graph linking the inputs with the output, as shown in FIG. 9. Finally, it generates executable glue code to actually invoke the web service discovered (in this case, MapQuest™) and return a map of the requested address.

The above example user inputs are the same as what would be required if the user were simply to visit MapQuest™ and request the map directly, although the user does not have to know how to access MapQuest™ in order to use the Semantic Viewer as described in this example. If multiple map services were available, the Semantic Viewer would present the user with multiple execution paths, allowing access to whichever map service was desired, again without requiring the user to know the URL or data formatting requirements of each service.

Figure 10:
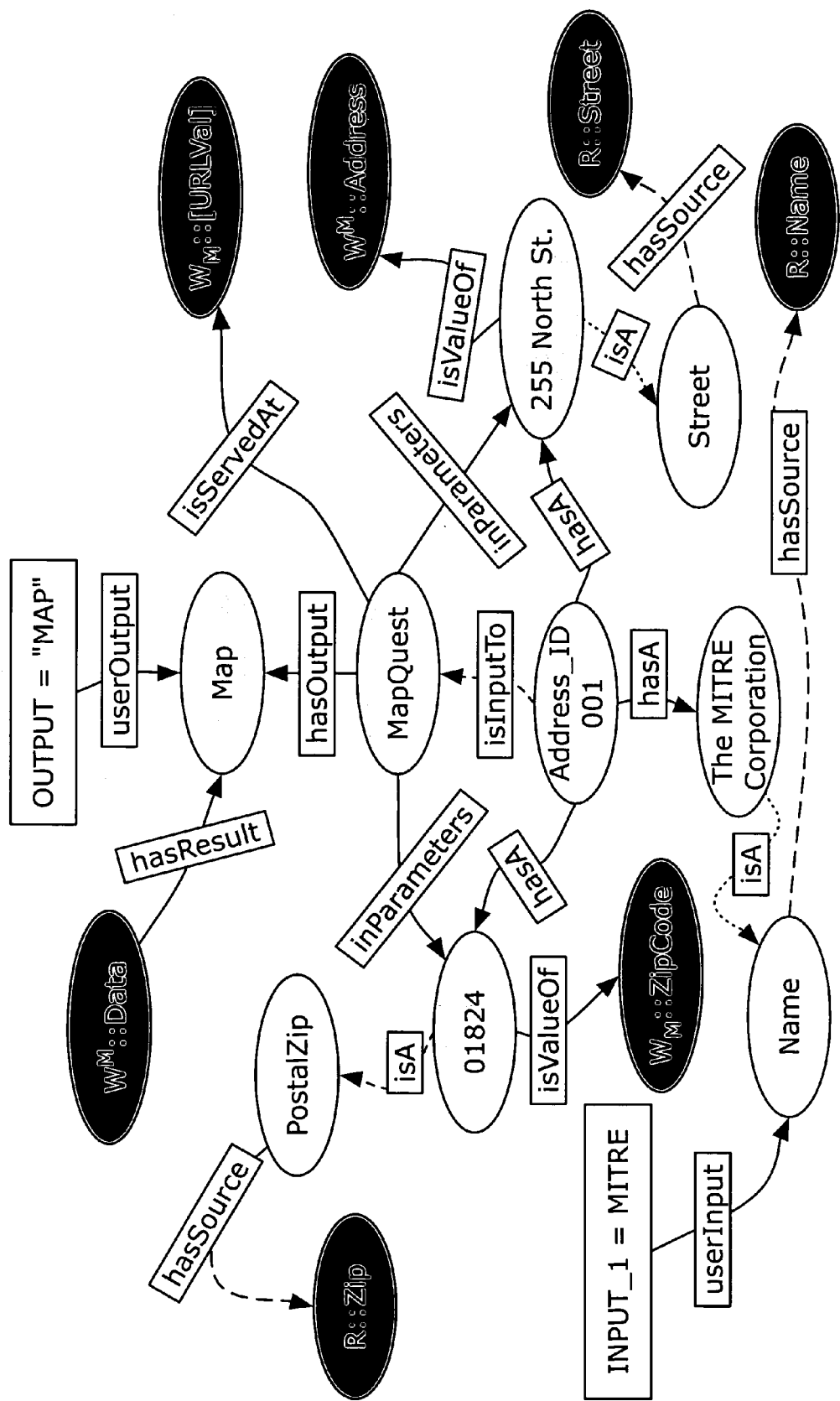

The additional power of the Semantic Viewer can be seen if the user instead enters "MITRE" as an input, and "map" as a requested output. No available web service in $D^{++}$ takes a corporate name and returns a map. However, the Semantic Viewer still locates "MITRE" in the database as an instance of Business_Name, and discovers a path through the ontology graph linking it to the Map output of MapQuest™, as shown in FIG. 10. Thus, the execution path returned now includes a database query to discover the street address of the MITRE Corporation, formats that data for the MapQuest™ map service, and returns a map of the company location.

Figures 11A, 11B:
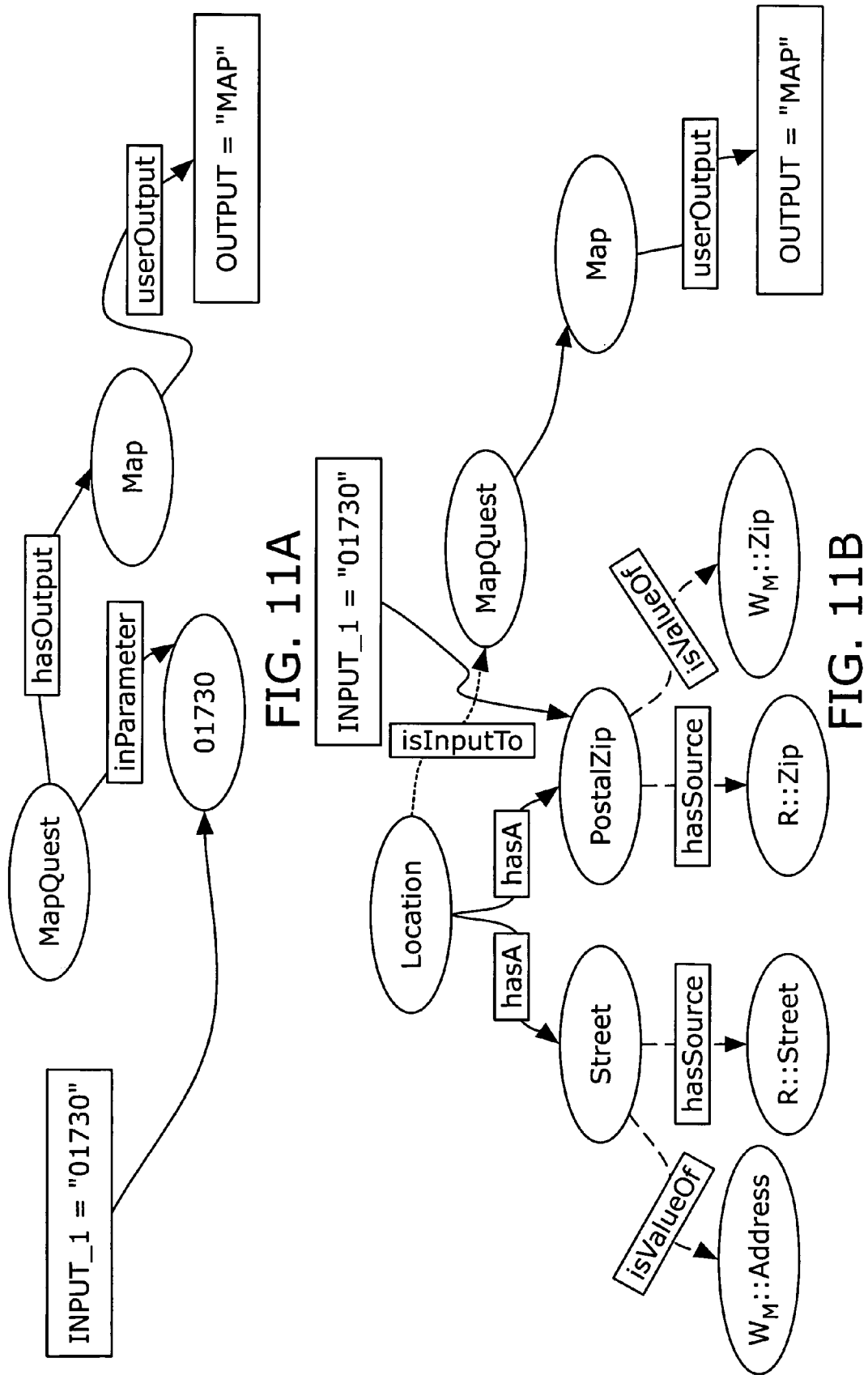

In practice, the Semantic Viewer may find multiple execution paths for a single query. In this case, the user may be presented with the multiple execution paths and allowed to select the desired path. For example, in the case where a user enters a single input of "01730" and a desired output of "map," there are two possible connecting paths through the $D^{++}$ described above. According to one path, illustrated in FIG. 11a, the Semantic Viewer recognizes "01730" as a zip code, and passes it to MapQuest™ without a street address, resulting in a map of the general area around that zip code (the recognition of "01730" as a zip code according to this path may be through its existence in the database, but it is also within the scope of the invention to manually indicate that 01730 is a zip code in order for the Semantic Viewer to discover an execution path). However, there also exists a path, illustrated in FIG. 11b, in which the Semantic Viewer finds each instance of "01730" in the database, and passes each Street Address/Zipcode combination (for each listed business having that zip code) to MapQuest™, obtaining maps for every business in the selected zip code area.

In the above examples, a single output of a single web service has been the desired output. However, multiple outputs may also be requested, and these outputs may not all be derived from the same web service. For example, suppose a user enters a single input of "01730" and desired outputs of "map" and "business name." In this case, an execution path similar to the second path described in the previous paragraph exists. The Semantic Viewer recognizes 01730 as a zip code, and queries the database to find all of the businesses in that zip code, requesting both the business name and the street address. The street addresses and the selected zip code are passed to MapQuest™, and the resulting maps are returned along with the business names, for each business in the database that matches the criteria.

The Semantic Viewer may also "chain" web services as necessary to obtain a desired result. For example, suppose the domain ontology also contains the relationships hasVoiceNumber and hasFaxNumber, and has been further augmented to include a reverse lookup telephone service (such as that found at Switchboard™), which accepts an input "telephone number" and provides a listing name and address. In this case, when a user enters "781-271-2000" as input and "map" as output, one of the returned execution paths will include taking the telephone number from the database listing, passing it to the reverse lookup service to obtain a street address, and passing the street address to MapQuest™ to obtain the requested map.

Similarly, web services may operate in parallel on the same or related inputs to provide multiple outputs. For example, web services that provide maps (as discussed above) and aerial photos (such as that found at TerraServer-USA) may both be called with the same address information, if an address is input and both "map" and "photo" are selected as outputs.

Figure 12:
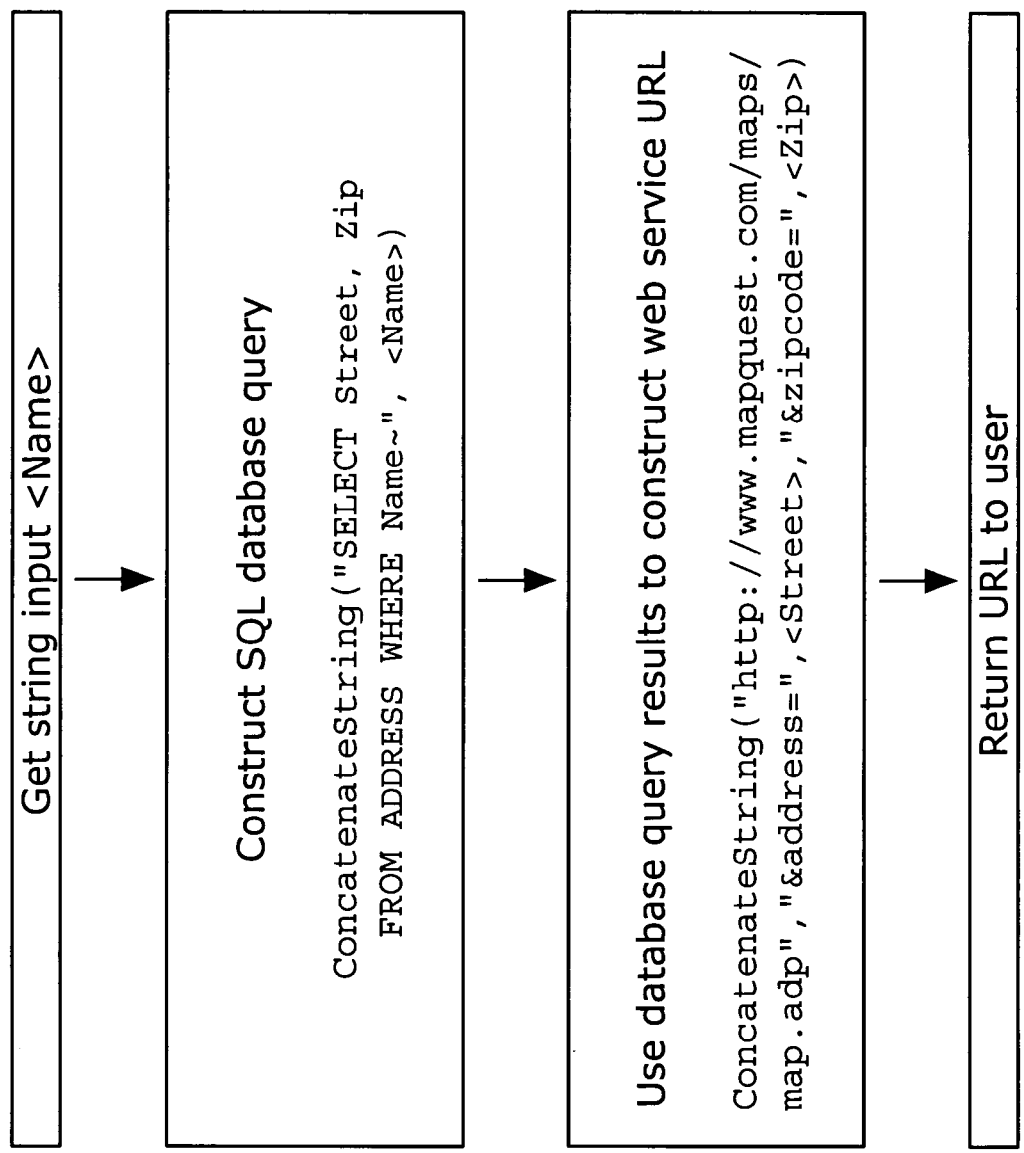
FIG. 12 is a flow chart for a standalone web service whose glue code may be generated by the Semantic Viewer.

For each of the above-described examples, the Semantic Viewer has located an execution path, and then performed the necessary steps to answer a user query. However, the execution path may also be used to generate glue code necessary to create a new service of the type requested. For example, in the case described above in which a user provided the input "MITRE" and the output "map," in addition to simply providing a map of the MITRE location, the Semantic Viewer can also return executable "glue code" for a service that accepts a company name, looks it up in the database to find a street address, passes the street address to MapQuest™, and returns the requested map. This static code can then be directly used to create a new standalone web service which is independent of the Semantic Viewer. A flow chart of the resulting web service, including exemplary pseudocode describing the construction of a SQL database query and a web service URL, is shown in FIG. 12. Of course, the code generated will depend on the specific requirements of the database and web service. Further the database type and query syntax may be represented in ontological form and linked to the R in an analogous way to the construction of $W_M$ for accessing the web service, as discussed above.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of generating executable code for linking data in a relational database to structured inputs and outputs of a source web service, comprising:
   providing a first ontology describing concepts and relationships of the data in the database and organized according to the structure of the database;
   linking the first ontology to a second ontology that describes concepts and relationships of the structured inputs and outputs of the source web service to provide a merged ontology, the merged ontology including both the concepts and relationships of the database and the concepts and relationships of the source web service;
   mapping the data in the database and the structured inputs and outputs of the source web service to the merged ontology to create an expanded ontology;
   searching the expanded ontology for an execution path between one or more desired inputs and one or more corresponding desired outputs through concepts of the expanded ontology originating in the first ontology and the second ontology;
   generating executable code that accepts the one or more desired inputs, obtains a set of data from the database corresponding to the one or more desired inputs and responsive to the structured inputs of the source web service, and executes steps of the execution path of the expanded ontology to invoke the source web service using the set of data from the database to produce the corresponding desired outputs; and
   using the generated executable code to create a new web service that accepts the one or more desired inputs and that produces the desired outputs.

2. The method of claim 1, wherein said mapping step comprises:
   mapping the data in the database to the first ontology to create a first set of mappings;
   mapping the structured inputs and outputs of the source web service to the second ontology to create a second set of mappings; and
   transferring the first set of mappings and the second set of mappings to the merged ontology.

3. The method of claim 1, wherein the second ontology further comprises access parameters for the source web service.

4. The method of claim 1, wherein the execution path includes at least one concept from the first ontology and at least one concept from the second ontology.

5. The method of claim 1, further comprising providing the second ontology.

6. The method of claim 1, further comprising generating the second ontology.

7. The method of claim 1, wherein the providing step comprises:
   constructing a database ontology that describes one or more of (i) a structure of the database, (ii) an algebra of the database, (iii) constraints of the database, and (iv) schema and instances of data within the database; and
   linking the database ontology and a third ontology that includes concepts and relationships relevant to the data within the database to form the first ontology.

8. The method of claim 1, wherein providing the first ontology describing concepts and relationships of the data in the database comprises:
   providing an upper ontology specifying the structure, algebra, and constraints of the database; and
   providing a lower ontology including the data in the database as instances of the upper ontology.

9. A method for constructing a web service that provides a selected output type in response to a selected input, comprising:
   accepting an input item from a user;
   accepting an output type from the user;
   searching an ontology to find one or more input matches for the input item, the ontology comprising data from a database organized according to the structure of the database, and structured input and output information from a web service;
   searching the ontology to find one or more output matches for the output type;

searching the ontology to identify an execution path between at least one of the one or more input matches and at least one of the one or more output matches through concepts of the ontology originating in the database and the web service;

generating executable code for a new web service that allows a user to provide an input of a type corresponding to the accepted input item, obtains a set of data from the database corresponding to the one or more desired inputs and responsive to the structured input information from the web service, and that provides an output of the accepted output type by executing steps of the execution path of the ontology comprising data from the database and structured input and output information from the web service to invoke the web service using the set of data from the database to produce the output of the accepted output type; and creating the new web service using the executable code.

10. The method of claim 9, wherein searching the ontology to find an execution path comprises finding a plurality of execution paths.

11. The method of claim 10, further comprising allowing the user to select an execution path from the plurality of execution paths.

12. The method of claim 9, wherein searching the ontology to find one or more input matches comprises allowing the user to select from a plurality of input matches within the ontology.

13. The method of claim 9, wherein searching the ontology to find one or more output matches comprises allowing the user to select from a plurality of output matches within the ontology.

14. The method of claim 9, wherein the execution path includes at least one concept from the database and at least one concept from the structured input and output information from the web service.

15. A method of mapping a web service having a set of one or more structured inputs and a set of one or more structured outputs to an ontology, the method comprising:

searching the ontology to locate concepts within the ontology having an output type corresponding to a structured input of the web service, the ontology comprising concepts and relationships of data from a database organized according to the structure of the database;

adding mappings between the structured inputs and the located concepts having the output type corresponding to the structured input of the web service to the ontology;

searching the ontology to locate concepts within the ontology having an input type corresponding to a structured output of the web service;

adding mappings between the structured outputs and the located concepts having the input type corresponding to the structured output of the web service to the ontology; and adding a concept to the ontology representing the web service with mappings between the added concept, the structured inputs, and the structured outputs in order to create an augmented ontology comprising at least one path through a concept of the ontology, the concept of the ontology corresponding to a set of data from the database selected based on a desired input and responsive to the structured input of the web service, and the concept representing the web service invoked using the set of data from the database to produce a desired output.

16. The method of claim 15, further comprising adding a concept to the ontology representing a method of accessing the web service.

17. A method of linking a collection of structured data in a relational database to a source web service, comprising:

generating a first ontology describing concepts and relationships of the data in the database and organized according to the structure of the database;

providing a second ontology describing concepts and relationships in structured inputs and outputs of the source web service;

linking the first and second ontologies to provide a merged ontology including both the concepts and relationships of the database and the concepts and relationships of the source web service, the merged ontology comprising at least one path through the first ontology and the second ontology originating from a concept of the first ontology corresponding to a set of data from the database derived from a desired input, and invoking the source web service using the set of data from the data base to produce a desired output; and mapping (i) the data in the collection to the merged ontology and (ii) the structured inputs and outputs from the source web service to the merged ontology to create an expanded ontology.

18. The method of claim 17, wherein the generating step comprises:

constructing an intermediate ontology that describes one or more of (i) a structure of the collection of structured data, (ii) an algebra of the collection of structured data, (iii) constraints of the collection of structured data, and (iv) schema and instances of data within the collection of structured data; and linking the intermediate ontology and a third ontology that includes concepts and relationships relevant to the data within the collection of structured data to form the first ontology.

19. The method of claim 17, further comprising searching the expanded ontology for an execution path between an input to the web service and an output;

generating executable code that accepts the one or more specified inputs and executes steps of the execution path to produce the specified outputs; and using the generated executable code to create a new web service that accepts the one or more specified inputs and that produces the specified outputs.

20. A system for linking a collection of structured data in a relational database to a source web service, comprising:

a memory storing:

a generating module to generate a first ontology describing concepts and relationships of the data in the database and organized according to the structure of the database;

a providing module to provide a second ontology describing concepts and relationships in structured inputs and outputs of the source web service;

a linking module to link the first and second ontologies to provide a merged ontology including both the concepts and relationships of the database and the concepts and relationships of the source web service, the merged ontology comprising at least one path through the first ontology and the second ontology originating from a concept of the first ontology corresponding to a set of data from the database derived from a desired input and invoking the source web service using the set of data from the database to produce a desired output; and a mapping module to map (i) the data in the collection to the merged ontology and (ii) the structured inputs and outputs from the source web service to the merged ontology to create an expanded ontology; and one or more processors configured to process the modules.

21. A computer-readable storage medium having computer program code recorded thereon that, when executed by a processor, causes the processor to perform a method for linking a collection of structured data in a relational database to a source web service, the method comprising:

generating a first ontology describing concepts and relationships of the data in the database and organized according to the structure of the database;

providing a second ontology describing concepts and relationships in structured inputs and outputs of the source web service;

linking the first and second ontologies to provide a merged ontology including both the concepts and relationships of the database and the concepts and relationships of the source web service, the merged ontology comprising at least one path through the first ontology and the second ontology originating from a concept of the first ontology corresponding to a set of data from the database derived from a desired input, and invoking the source web service using the set of data from the database to produce a desired output; and mapping (i) the data in the collection to the merged ontology and (ii) the structured inputs and outputs from the source web service to the merged ontology to create an expanded ontology.

* * * * *